(Model.)
F. A. GRAFF & L. C. HIPPLE.
DUMPING WAGON.
No. 299,377. Patented May 27, 1884.
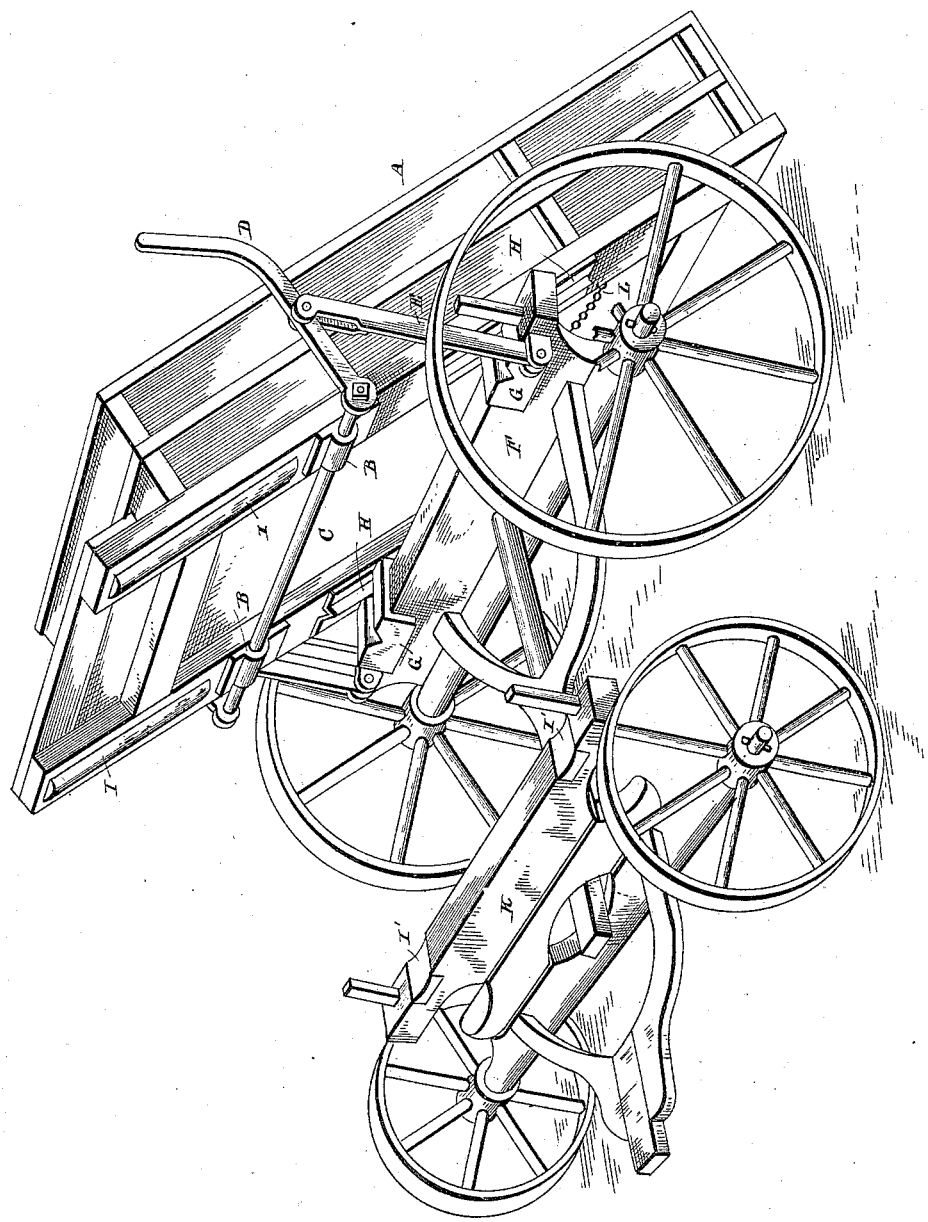
WITNESSES
Edwin L. Yewee.
J. J. McCarthy.
INVENTORS
Francis A. Graff and
Louis C. Hipple
By C. M. Alexander Attorney

UNITED STATES PATENT OFFICE.

FRANCIS A. GRAFF AND LOUIS C. HIPPLE, OF NEW ALBANY, INDIANA.

DUMPING-WAGON.

SPECIFICATION forming part of Letters Patent No. 299,377, dated May 27, 1884.

Application filed February 28, 1884. (Model.)

*To all whom it may concern:*

Be it known that we, FRANCIS A. GRAFF and LOUIS C. HIPPLE, citizens of the United States, residing at the city of New Albany, in the county of Floyd and State of Indiana, have invented a new and useful Machine for Dumping Wagons and other Vehicles, of which the following is a specification.

Our invention relates to dumping devices for wagons and other vehicles, and is designed to provide a means whereby the said vehicles may be made to dump the load contained and then quickly returned to their normal position. This is accomplished by tilting the body of the vehicle, using the rear axle as a fulcrum, by means of suitable mechanism, as is illustrated in the accompanying drawing, which is a perspective view of the device as attached to and actuating an ordinary four-wheeled wagon.

A represents the body of the wagon, and is of ordinary construction. On the under side of each longitudinal piece of the frame, near the front, is secured a bearing, B, which serve to support a rod, C, extending laterally across the under side of the body, and project somewhat on each side of the same. To each of the projecting ends of the rod is an upright lever, D, having its upper end bent toward the front of the wagon. This lever has a movable fulcrum formed by a rod, E, pivoted to it, as shown, and also pivoted to suitable bearings in the rear support of the body. This support F is of usual form, and rests on and is secured to the axle. Near each end of the support F is secured a plate, G, having on its upper surface a longitudinal V-shaped groove, as shown. On the side pieces of the frame of the wagon-body is a long plate, H, having on its surface a V-tongue adapted to fit and slide in the groove in the plate G. On the bottom of the front ends of the said side pieces of the body-frame is secured the plate I, having a convex surface, as shown. These plates are adapted to bear on and slide in suitable grooved plates, I', secured in the upper surface of the front support, K, of the body. The running-gear is all of common construction and needs no description.

To the rear of the wagon-body and connected to the rear axle are the check-chains L, to prevent the said body sliding too far to the rear when it is dumping its contents. It will readily be seen that a slight backward movement of the lever will, when in the position shown, lift the body forward, and thus throw sufficient weight on that end to cause it to fall into place. A reverse motion of the lever will throw the body to the rear sufficient to overbalance it, so that it will tilt up on the rear axle and assume the position shown in the drawing, at the same time discharging its load.

Having described the invention, what we claim is—

1. The transverse rod and its bearings, the levers connected to the ends thereof, and the movable fulcrum pivotally connected and supported, all operating to tilt and replace a body of a wagon or other vehicle for the purpose of dumping the load, as specified.

2. In combination with the dumping devices, the rear V-grooved plates embracing and secured to the rear bolster of the running-gear, and the V-tongued plates secured to the body, the parts adapted to allow a longitudinal guided movement of the said body, and also forming the fulcrum-point of the same, substantially as described.

3. In combination with the dumping devices, the front grooved plates let into the front bolsters of the running-gear, and the convex plates secured to the wagon-body, and adapted to guide the longitudinal movement of the front of the said body before it tilts in dumping, substantially as described.

4. The combination, in a dumping wagon or vehicle, of the levers with their connecting-rod and its bearings, the pivoted fulcrum-rod, the rear grooved and tongued plates, and the forward grooved and convex plates, all operating as and for the purpose specified.

FRANCIS A. GRAFF.
LOUIS C. HIPPLE.

Witnesses:
JACOB HERTER,
J. V. KELSO.